United States Patent
Ekambaram et al.

(10) Patent No.: US 9,811,987 B2
(45) Date of Patent: Nov. 7, 2017

(54) DETECTING OBJECT THEFT USING SMART TEXTILES

(71) Applicant: INTERNATIONAL BUSINESS MACHINES CORPORATION, Armonk, NY (US)

(72) Inventors: Vijay Ekambaram, Tamilnadu (IN); Ashok Pon Kumar Sree Prakash, Bangalore (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 14/872,172

(22) Filed: Oct. 1, 2015

(65) Prior Publication Data

US 2017/0098353 A1    Apr. 6, 2017

(51) Int. Cl.
  *G08B 13/14*    (2006.01)
  *H04B 5/00*    (2006.01)

(52) U.S. Cl.
  CPC ........... *G08B 13/14* (2013.01); *H04B 5/0025* (2013.01)

(58) Field of Classification Search
  CPC .. G08B 13/14; G08B 13/1436; G08B 13/184; G08B 13/187; G08B 13/1463; G08B 13/1454
  See application file for complete search history.

(56) References Cited

U.S. PATENT DOCUMENTS

| | | | |
|---|---|---|---|
| 4,780,704 A | | 10/1988 | Tommasini |
| 5,053,750 A | * | 10/1991 | Alex ...................... G08B 13/14 200/61.19 |
| 5,642,095 A | * | 6/1997 | Cook ................... A45C 11/184 150/102 |
| 8,111,144 B2 | * | 2/2012 | Kirkup ................. G06F 1/1626 340/13.25 |
| 8,295,894 B2 | * | 10/2012 | Macfarlane ........ G08B 13/1481 340/5.8 |
| 8,831,509 B2 | * | 9/2014 | Moosavi ........... H04W 52/0251 455/41.1 |
| 9,659,482 B2 | * | 5/2017 | Yang ...................... G08B 23/00 |

(Continued)

FOREIGN PATENT DOCUMENTS

| | | |
|---|---|---|
| CN | 101216977 A | 7/2008 |
| CN | 203192154 U | 9/2013 |

(Continued)

*Primary Examiner* — Hai Phan
*Assistant Examiner* — Son M Tang
(74) *Attorney, Agent, or Firm* — Law Office of Jim Boice

(57) ABSTRACT

A smart textile garment includes a smart textile pocket, a near field communication (NFC) transmitter, an NFC receiver, an electromyography (EMG) sensor, an event processor, and an alert device. The smart textile pocket has a first pocket side and a second pocket side. The NFC transmitter is embedded in the first pocket side, and the NFC receiver is embedded in the second pocket side. The EMG sensor is embedded in a sleeve of the smart textile garment, and indicates a physical movement of a hand of a wearer of the smart textile garment in real time. Based on readings from the NFC receiver and the EMG sensor, the event processor determines that the object has been removed from the smart textile pocket by someone other than the wearer of the smart textile garment.

20 Claims, 4 Drawing Sheets

(56) References Cited

U.S. PATENT DOCUMENTS

| | | | | |
|---|---|---|---|---|
| 2006/0022822 | A1* | 2/2006 | Wong | A45F 5/02 340/568.1 |
| 2009/0045953 | A1* | 2/2009 | Lenshin | G08B 13/1427 340/568.1 |
| 2013/0321163 | A1* | 12/2013 | Brenner | G08B 13/1436 340/686.6 |
| 2014/0055266 | A1* | 2/2014 | Valiulis | G08B 13/1481 340/572.1 |
| 2016/0352391 | A1* | 12/2016 | Lin | H04B 5/0056 |
| 2017/0052613 | A1* | 2/2017 | Alameh | G06F 3/165 |

FOREIGN PATENT DOCUMENTS

| | | |
|---|---|---|
| DE | 19738321 A1 | 3/1999 |
| DE | 20209686 U1 | 3/2003 |
| DE | 10317453 A1 | 11/2004 |
| FR | 2765461 A1 | 1/1999 |
| WO | 2012019645 A1 | 2/2012 |

\* cited by examiner

US 9,811,987 B2

DETECTING OBJECT THEFT USING SMART TEXTILES

BACKGROUND

The present disclosure relates to the field of smart textiles, and specifically to smart textiles that are used to construct garment pockets. More specifically, the present disclosure relates to using smart textiles to detect an unauthorized removal of an object from a garment pocket made from a smart textile.

SUMMARY

In an embodiment of the present invention, a smart textile garment comprises a smart textile pocket, a near field communication (NFC) transmitter, an NFC receiver, an electromyography (EMG) sensor, an event processor, and an alert device. The smart textile pocket has a first pocket side and a second pocket side. The NFC transmitter is embedded in the first pocket side, and the NFC receiver is embedded in the second pocket side. The EMG sensor is embedded in a sleeve of the smart textile garment, and indicates a physical movement of a hand of a wearer of the smart textile garment in real time. The event processor is coupled to the NFC transmitter and the NFC receiver, and detects a change in an NFC signal strength between the NFC transmitter and the NFC receiver. The change in the NFC signal strength between the NFC transmitter and the NFC receiver indicates that an object has been removed from the smart textile pocket. The event processor correlates EMG sensor readings from the EMG sensor and the NFC signal strength between the NFC transmitter and the NFC receiver in order to determine that the object has been removed from the smart textile pocket without use of the hand of the wearer of the smart textile garment. The event processor then generates and transmits an event signal in response to determining that the object has been removed from the smart textile pocket without use of the hand of the wearer of the smart textile garment. An alert device, which receives the event signal from the event processor, then emits an alarm.

In an embodiment of the present invention, a method and/or computer program product detects an improper removal of an object from a smart textile pocket in a smart textile garment. An event processor, which is coupled to a first near field communication (NFC) transmitter embedded in a first pocket side of a smart textile pocket and an NFC receiver embedded in a second pocket side of the smart textile pocket, detects a change in an NFC signal strength between the NFC transmitter and the NFC receiver. The change in the NFC signal strength between the NFC transmitter and the NFC receiver indicates that an object has been removed from the smart textile pocket. The event processor receives, from an electromyography (EMG) sensor embedded in a sleeve of the smart textile garment, an EMG positioning signal that indicates a physical movement/position of a hand of a wearer of the smart textile garment in real time. The event processor correlates EMG sensor readings from the EMG sensor and the NFC signal strength between the NFC transmitter and the NFC receiver in order to determine that the object has been removed from the smart textile pocket without use of the hand of the wearer of the smart textile garment. The event processor then generates and transmits an event signal in response to determining that the object has been removed from the smart textile pocket without use of the hand of the wearer of the smart textile garment. An alert device then emits an alarm in response to receiving the event signal from the event processor.

DETAILED DESCRIPTION

Figure 1:
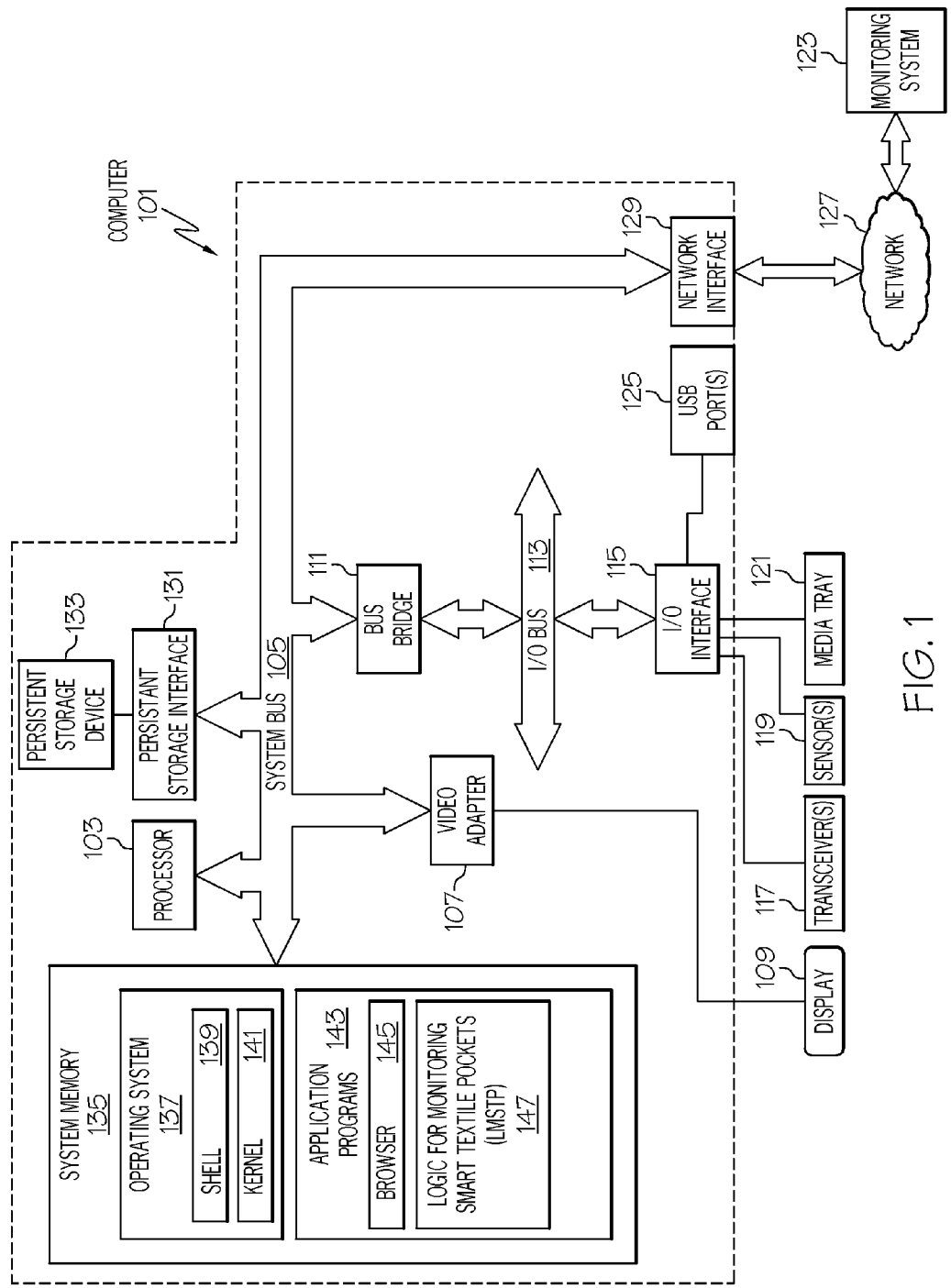
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described herein, the present invention provides a device, method, and/or computer program product for detecting if an object has been stolen or otherwise removed without authorization from a pocket of a garment being worn by a user. More specifically, the present invention utilizes a garment constructed of a smart fabric for detecting improper removal of an object from a pocket in the garment.

A smart textile is defined as a fabric/textile that has electronic hardware devices embedded within that fabric/textile. Such electronic hardware devices include but are not limited to (flexible) optical and/or metallic fibers for carrying electrical signals, a processor (including a microprocessor that includes rudimentary software, input/output interfaces, etc.), a data bus, and sensors.

Being the closest layer to a user's body, smart textiles provide an ideal platform for the integration of sensors and actuators for physiological signals. Thus, smart textiles combine sensors, actuators, and signal processing capabilities. The smart textiles can be used to construct shirts, pants, jackets, hats, and any other type of garment designed to be worn by a user.

As described in the present disclosure, the present invention provides a system that detects when an item is improperly removed (i.e., lost or stolen) from a pocket in a smart textile garment. Through the use of hardware logic within the smart textile garment, the present invention requires no coupling to electronics within the item. That is, the present invention does not require the item to have a transceiver, radio frequency identifier (RFID) chip, or any other type of electronic device that communicates with another system. Rather, the item in the pocket need only be able to have physical dimensions that spread the pocket open. Thus, the item in the pocket not only need have no circuitry of its own, it can be ferrous or non-ferrous.

Once the item in the pocket is detected by the smart textile as being lost, stolen, or otherwise removed from the pocket, the user is alerted by one or more alarm devices, such as a vibrating device, an audible device, a light, etc.

Thus, consider the scenario in which (a) an object is removed from a pocket in a smart textile garment, and (b) the owner is not in control of the removed object (i.e., the wearer of the smart textile garment did not intentionally remove the object from the pocket). If both (a) and (b) occur together, then the object is indeed stolen/lost.

In accordance with one or more embodiments of the present invention, near field communication (NFC) circuits are placed on both sides of the pocket.

NFC circuits use s a very short-range communication channel that is affected by physical objects. That is, if a physical object, even a non-ferrous physical object, is placed between an NFC transmitter and an NFC receiver, the NFC signal will be attenuated (reduced in strength) by the physical object. Thus, when an object is removed from a pocket made of a smart textile that has NFC transceiver capabilities, communication between NFC circuits significantly increases; when the object is placed back into the pocket, communication between NFC circuits significantly reduces. Using this feature of NFC circuits, the event of removing object from the pocket can be immediately detected by a processor.

Detecting whether the owner/user/wearer of the object and smart garment is in control of removing the object is determined by movement of the arm/hand of the user.

In one embodiment of the present invention, this determination is based on electromyography (EMG) sensors, which may be embedded within the smart fabric. That is, EMG sensors within the sleeves of the smart fabric garment are able to detect the location and position of the arms/hands of the wearer, in order to determine that the user himself is placing his hands in the pocket of the smart textile pocket of the smart fabric garment.

In one embodiment of the present invention, the determination that the wearer is placing his hand inside the pocket is achieved through the use of other NFC transceivers in the smart textile garment. Thus, if an NFC transmitter on a sleeve cuff of the smart fabric garment comes within a predetermined distance of an NFC receiver in the pocket of the smart fabric garment, then the system assumes that the wearer is placing his hand into the pocket, and any removal of an object from the pocket is intentionally performed by the wearer.

In either embodiment, if the system detects that the wearer's hand is not near the pocket in the smart textile garment when the object leaves the pocket, then an assumption is made that the object is accidentally falling out of the pocket or is being stolen.

Thus, as soon as the NFC circuits (in the smart pockets) identify that the object has been removed from the pocket, the system checks whether the owner did a grabbing motion (detected using EMG sensors embedded in the sleeves or NFC proximity sensors as just described).

If a determination is made that the object has been dropped/lost/stolen, then an alarm is issued. In one embodiment of the present invention, a haptic alarm (e.g., strong vibrations from a tactile alarm electro-mechanical device) in the location of the pocket is activated, thus letting the wearer know immediately which pocket has lost the object.

As described herein, the present invention utilizes three main components: NFC circuits, EMG sensors, and a proximity short-range communication channel between the NFC circuits.

NFC Circuits: NFC Circuits are embedded in the user's pockets (e.g., on both internal side of the pocket). NFC transmitter grids are attached to one internal side of the pocket and NFC receiver grids are attached to the other internal side of the pockets. More interference between the transmitter and receiver grids results in a lessening of the communication strength between the two NFC circuits (i.e., the NFC transmitter grids and the NFC receiver grids). Thus, if the connection strength between NFC circuits significantly reduces/increases, it implies, some object is put or removed (respectively) from the pocket.

Electromyography (EMG) Sensors: EMG Sensors embedded in shirt sleeves detect a hand grabbing event in which the wearer of the smart textile garment is reaching into the pocket. EMG sensors detect bioelectric activity within muscles and/or detect physical movement of the muscles. Thus, if detecting bioelectric activity (i.e., ionic electrical signals propagating along specific muscles), the EMG sensor is a highly sensitive electronic field detector. If detecting muscle movement (e.g., muscle flexion or extension), the EMG sensor is a highly sensitive mechanical sensor (e.g., a pressure sensor, a strain gauge, etc.).

Proximity short range communication channel between two objects: There are multiple ways to detect closeness of two objects. One such way is by using a proximity short range communication channel (e.g., a NFC channel) between two objects (e.g., an NFC transmitter and an NFC receiver). Based on the communication signal strength between a radio signal transmitter (e.g., an NFC transmitter embedded in object 1) and receiver (e.g., an NFC receiver embedded in object 2), the system is able to detect whether these two objects are near to each other or far away. Furthermore, by embedding a short range radio transmitter in the pocket and a suitable radio receiver in a shirt sleeve cuff, the system can identify/determine which of the user's hands is near the pocket. That is, NFC transmitter/receiver pairs are able to (a) detect whether or not a pocket is being expanded by an object within the pocket, and (b) how close the user's hand is to the pocket, particularly when the pocket collapses due to the object being removed from the pocket.

Thus, as described herein, the present invention detects the removal of an object from a pockets without any instrumentation on the object itself.

In one embodiment of the present invention, determining whether or not the wearer of the smart textile garment is the cause of an object being removed from a pocket is time and space dependent. For example, if a user u1 does an grabbing event e1 at time t at location l, and an object removal event e2 occurred in the proximity of location l within t+Δt, then it is most likely that e2 is a result of e1 and is done by u1.

The detection of grabbing event e1 is performed using muscle movement sensors (i.e., EMG sensors) embedded in shirt sleeves, and detecting the location of grabbing event e1 is achieved using proximity sensors. Similarly, the system can detect object removal event e2 using NFC circuits embedded in the smart textile garment's pockets. The system (e.g., computer 101 shown in FIG. 1) then correlates the detected grabbing event e1 that happened at location l and object removal event e2 which also happened at location l on a certain timescale (i.e., within a predetermined amount of time) in order to decide whether e1 and e2 are related or not, which allows the system to detect whether it is the owner who removed the object from the pocket.

In one or more embodiments of the present invention, even if the user only placed a couple of his/her fingers into the pocket (as detected by the NFC circuits and/or EMG sensors described herein), an assumption is made that the user removed the object from the pocket.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by monitoring system 121 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including transceiver(s) 117, sensor(s) 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with monitoring system 123 using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A persistent storage interface 131 is also coupled to system bus 105. Persistent storage interface 131 interfaces with a persistent storage device 133, such as a hard drive, a static memory, a flash drive, etc. In one embodiment, persistent storage device 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, persistent storage management, and input/output management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication between computer 101 and monitoring system 123.

Application programs 143 in computer 101's system memory also include Logic for Monitoring Smart Textile Pockets (LMSTP) 147. LMSTP 147 includes code for implementing the processes described below, including those described in FIGS. 2-5.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
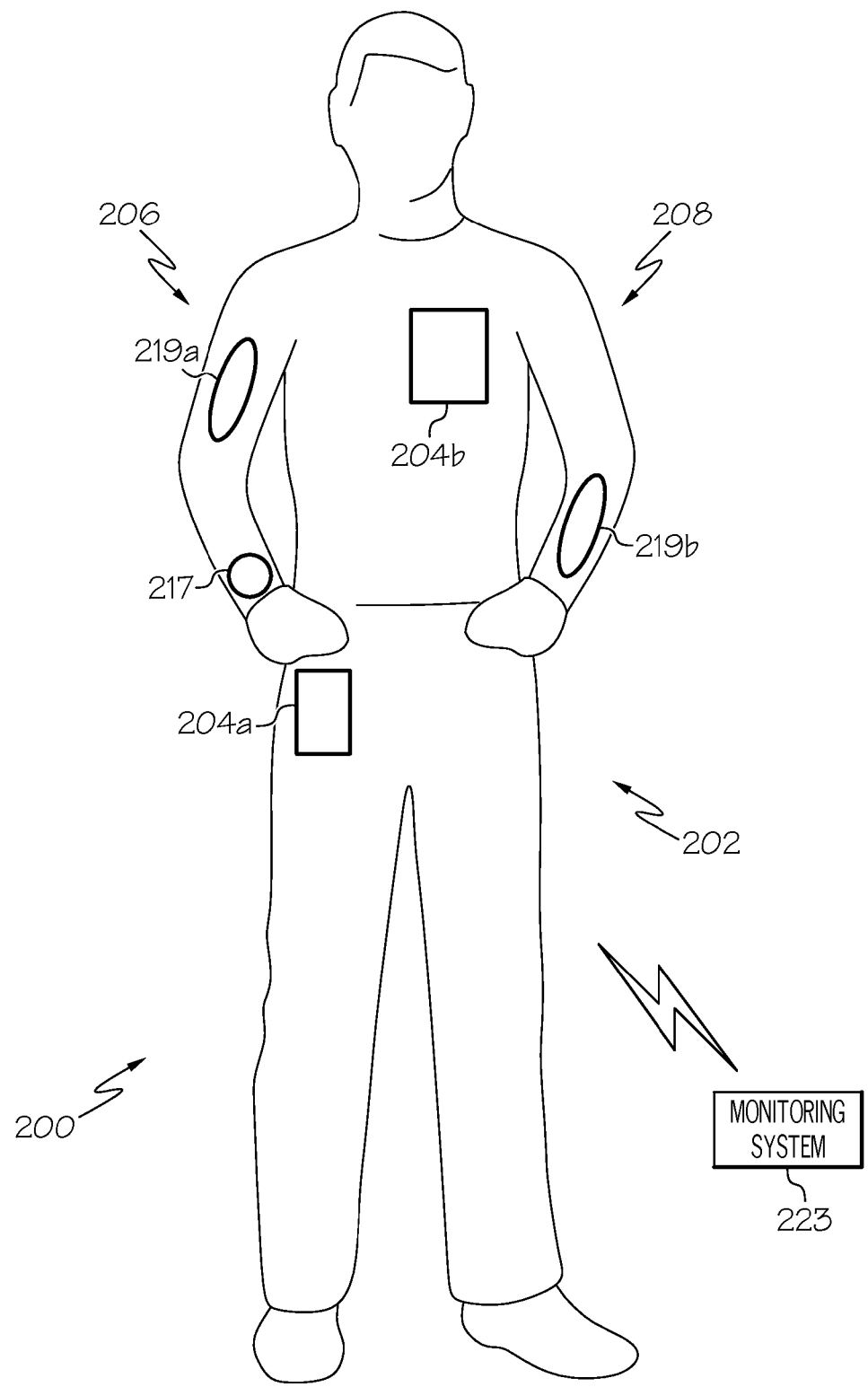
FIG. 2 illustrates a user wearing a smart textile garment in accordance with one or more embodiments of the present invention.

With reference now to FIG. 2, a user 200 is depicted wearing a smart textile garment 202 in accordance with one or more embodiments of the present invention. As depicted, smart textile garment 202 includes a first smart textile pocket 204a and a second smart textile pocket 204b. Smart textile pocket 204a and/or smart textile pocket 204b may have circuitry that is integrated into the smart textile garment 202, or they may be stand-alone device that are not integrated into smart textile garment 202. That is, processors, busses, and other electronic devices required by a smart textile may be integrated into all of the smart textile garment 202, or only within the smart textile pockets 204a/204b.

Figure 3:
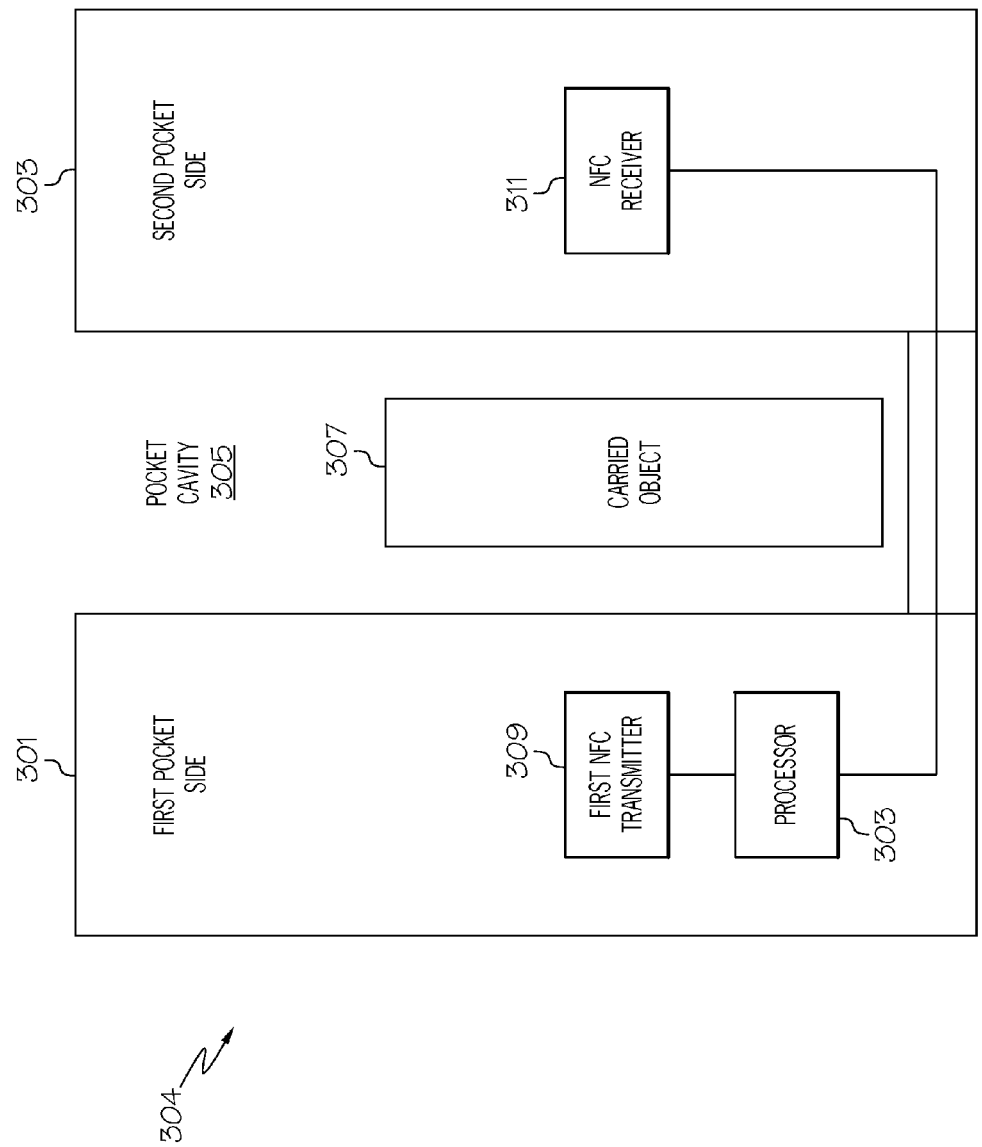
FIG. 3 depicts additional detail of a smart textile pocket in the smart textile garment depicted in FIG. 2.

With reference now to FIG. 3, additional detail of a smart textile pocket 304 (analogous to smart textile pockets 204a/204b shown in the smart textile garment 202 depicted in FIG. 2) is presented. As shown, smart textile pocket 304 has two sides: a first pocket side 301 and a second pocket side 303. For example, if smart textile pocket 304 is the smart textile pocket 204b shown on the shirt of the smart textile garment 202 in FIG. 2, then first pocket side 301 may be the side of the smart textile pocket 204b that is closest to the skin of the user 200, while second pocket side 303 may be the side of smart textile pocket 204b that actually forms the pocket cavity 305 shown in FIG. 3. Alternatively, second pocket side 303 may be the side of the smart textile pocket 204b that is closest to the skin of the user 200, while first pocket side 301 may be the side of smart textile pocket 204b that actually forms the pocket cavity 305 shown in FIG. 3.

As depicted in FIG. 3, a carried object 307 (e.g., a phone, a wallet, etc.) is initially retained within pocket cavity 305 of the smart textile pocket 304.

Embedded within first pocket side 301 is a processor 303, which may be a processor such as processor 103 depicted in FIG. 1 if the smart textile garment 202 has the computer architecture (e.g., storage devices, system busses, etc.) of computer 101 embedded therein. Alternatively, processor 303 may be a microprocessor that has all requisite hardware for processing data on-board.

Coupled to processor 303 is a first NFC transmitter 309, which is able to transmit an NFC signal, and an NFC receiver 311, which is able to receive an NFC signal. As described herein, if the carried object 307 is within the pocket cavity 305, then the NFC signal will be lessened due to the signal interference that the carried object 307 causes between the first NFC transmitter 309 and the NFC receiver 311. However, if the carried object 307 is removed, then the NFC signal from the NFC transmitter 309 will be received by the NFC receiver unimpeded, thus enabling processor 303 to determine that the carried object 307 has been removed.

In one embodiment of the present invention, the processor 303 takes advantage of the carried object 307 within the pocket cavity 305 physically impeding (at least partially blocking) the NFC signal between the first NFC transmitter 309 and the NFC receiver 311. This is certainly the case if the carried object 307 is constructed of a ferrous material that blocks radio frequency (RF) signals (e.g., a cell phone). However, if the carried object 307 is constructed of non-ferrous (e.g., a wallet), then the presence or absence of the carried object 307 within the pocket cavity 305 will still affect the strength of the NFC signal from the NFC transmitter 309 that is received by the NFC receiver 311, since NFC signals become weaker merely by the distance that they travel. Thus, the mere fact that the carried object 307 expands the pocket cavity 305, and thus the distance between the first NFC transmitter 309 and the NFC receiver 311, is enough to alter the strength of the NFC signal being received by the NFC receiver 311.

At this point, the only thing that the processor 303 can determine based on the strength of the NFC signal between the first NFC transmitter 309 and the NFC receiver 311 in FIG. 3 is that the carried object 307 has been removed. The processor 303 needs additional data to determine whether or not the removal of the carried object 307 was proper (i.e., the user deliberately removed the carried object 307) or improper (i.e., the carried object 307 was removed by a thief, accidentally fell out of the small textile pocket 304, etc.).

Referring again to FIG. 2, the processor 303 in FIG. 3 is able to determine if the removal of carried object 307 was by the user (and thus proper) through the use of electromyography (EMG) sensor 219a and/or EMG sensor 219b. For example, if EMG sensor 219a senses that the movement of the right arm 206 of user 200 indicates that the user's right hand is being placed into smart textile pocket 204a, then anything removed from smart textile pocket 204a is deemed to be proper by the processor 303. However, EMG sensor 219b senses that the user's left arm 208 is in a position such that the user's left hand is not near the smart textile pocket 204b or the smart textile pocket 204a, then the processor 303 determines that any object that is removed from smart textile pocket 204b or smart textile pocket 204a is improper.

While one embodiment uses EMG sensors 219a/219b to determine the real-time position of the arms/hands of user 200 shown in FIG. 2, in one embodiment the real-time position of the arms/hands of user 200 are determined by a second NFC transmitter 217 embedded in a sleeve of the smart textile garment 202. For example, assume that the second NFC transmitter 217 is embedded in the cuff of the right sleeve of the smart textile garment 202, as shown in FIG. 2. As the second NFC transmitter 217 gets closer and closer to the NFC receiver (shown in FIG. 3 as NFC receiver 311) embedded in the smart textile pocket 204a, the strength of the NFC signal being received by the NFC receiver gets stronger and stronger. If the strength of the NFC signal reaches a predetermined level, then the processor 303 shown in FIG. 3 will determine that the wearer of the smart textile garment 202 has his hand at or inside the smart textile pocket 204a.

Figure 4:
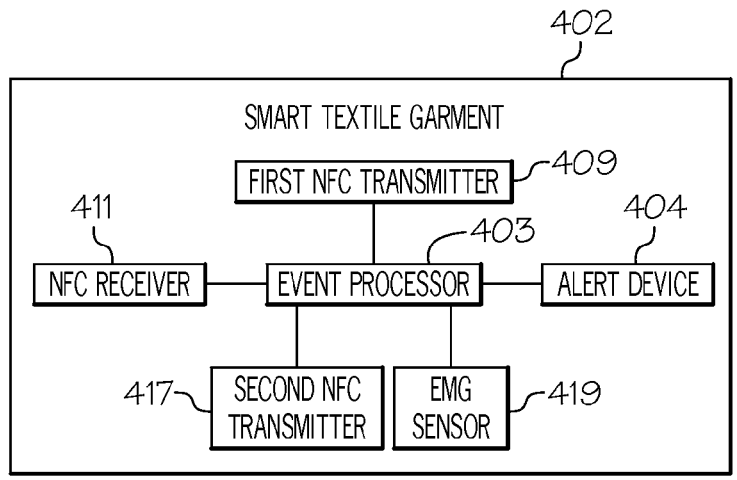
FIG. 4 illustrates a relationship between a processor, a near field communication (NFC) transmitter, an NFC receiver, an electromyography (EMG) sensor, and an alert device within and/or associated with the smart textile garment depicted in FIG. 2.

Thus and with reference now to FIG. 4, a relationship between a processor, a near field communication (NFC) transmitter, an NFC receiver, an electromyography (EMG) sensor, and an alert device within and/or associated with the smart textile garment depicted in FIG. 2 is presented. That is, event processor 403 (analogous to processor 303 shown in FIG. 3) is coupled to a first NFC transmitter 409 (analogous to the first NFC transmitter 309 shown in FIG. 3) and an NFC receiver 411 (analogous to the NFC receiver 311 shown in FIG. 3). As described above, this enables the event processor 403 to determine whether or not an object is inside a pocket of a smart textile garment (e.g., carried object 307 within the pocket cavity 305 as shown in FIG. 3). Furthermore, event processor 403 is able to use readings from a second NFC transmitter 417 (analogous to the second NFC transmitter 217 shown in FIG. 2) and/or an EMG sensor 419 (analogous to EMG sensors 219a/219b shown in FIG. 2) to determine where the hand(s) of the wearer of the smart textile garment 202 are when the object is removed from the pocket. Based on these readings/signals, the event processor 403 will generate and transmit an event signal/message to an alert device 404, which issues the alert about the object being removed from the pocket. Alert device 404 may be an aural device (i.e., an audible device such as a buzzer, a speaker, a horn, etc.), a visual device (i.e., a display integrated into the smart textile garment 202, a light emitting diode or other luminescent device embedded in the smart textile garment 202, etc.), a haptic device (i.e., a vibrating device), etc. In any embodiment, the alert device 404 lets the wearer of the smart textile garment 202 know that the object has been removed from one of the smart textile pockets 204a/204b shown in FIG. 2.

Figure 5:
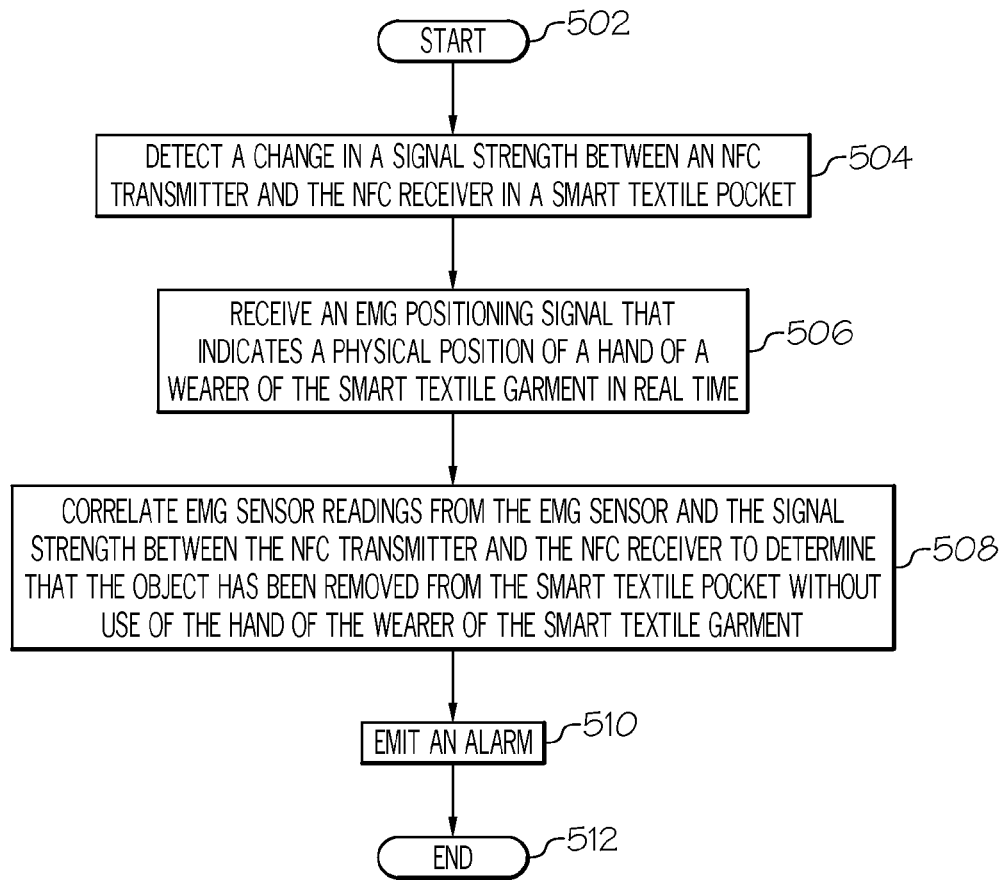
FIG. 5 is a high level flow chart of one or more steps performed by one or more processors and/or other hardware devices to detect an unauthorized removal of an object from a garment pocket made from a smart textile in accordance with one or more embodiments of the present invention.

With reference now to FIG. 5, a high level flow chart of one or more steps performed by one or more processors and/or other hardware devices in accordance with one or more embodiments of the present invention.

After initiator block 502, an event processor (e.g., event processor 409 shown in FIG. 4) that is coupled to a first near field communication (NFC) transmitter (e.g., first NFC transmitter 309 shown in FIG. 3) embedded in a first pocket side (e.g., first pocket side 301 shown in FIG. 3) of a smart textile pocket (e.g., smart textile pocket 204a shown in FIG. 2) and an NFC receiver (e.g., NFC receiver 311 shown in FIG. 3) embedded in a second pocket side (e.g., second pocket side 303 shown in FIG. 3) of the smart textile pocket detects a change in an NFC signal strength between the NFC transmitter and the NFC receiver, as described in block 504. The change in the signal strength between the NFC transmitter and the NFC receiver indicates an object has been removed from the smart textile pocket.

As described in block 506, an electromyography (EMG) sensor (e.g., EMG sensor 219b shown in FIG. 2), which is embedded in a sleeve of the smart textile garment, sends an EMG positioning signal to the event processor. The EMG positioning signal indicates/describes a physical movement (i.e., movement of muscles within the hand and/or positioning of the hand itself) of a hand of a wearer of the smart textile garment in real time.

As depicted in block 508, the event processor correlates EMG sensor readings from the EMG sensor and the signal strength between the NFC transmitter and the NFC receiver to determine that the object has been removed from the smart textile pocket without use of the hand of the wearer of the smart textile garment. The event processor then generates and transmits an event signal in response to this correlation (i.e., determining that the object has been removed from the smart textile pocket without use of the hand of the wearer of the smart textile garment). The EMG sensor thus detects a physical movement of the wearer's hand. This physical movement is interpreted as 1) a grabbing movement of the hand (e.g., when taking something out of a pocket) and/or 2) a physical position of the hand to a particular location (e.g., near the pocket).

As shown in block 510, the alert device (e.g., alert device 404 shown in FIG. 4) that receives the event signal then emits an alarm, warning the wearer of the smart textile garment that the object has been removed from the pocket.

The flow chart ends at terminator block 512.

In one embodiment of the present invention, the NFC receiver (e.g., NFC receiver 411 shown in FIG. 4) detects a signal from a second NFC transmitter (e.g., second NFC transmitter 217 shown in FIG. 2), which is embedded in a cuff of a sleeve on the smart textile garment. Based on this signal from the second NFC transmitter exceeding a predetermined strength, the event processor determines that the hand of the wearer of the smart textile garment is being placed proximate to (i.e., within and/or next to) the smart textile pocket, as described herein. Thus, if an object is removed from the pocket, the system assumes that the wearer/user did so.

In one embodiment of the present invention, the event processor also transmits the event signal (indicating that an object has been removed from a pocket improperly) to a monitoring computer (e.g., monitoring system 223 shown in FIG. 2) that is remote to (more than a predefined distance from) the smart textile garment. Thus, the monitoring system 223 can alert law enforcement authorities, other users, security monitoring services, etc. that the wearer of the smart textile garment 202 has either lost an object from a pocket in his smart textile garment, or else the object has been stolen from the wearer by a pickpocket (thief).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A smart textile garment comprising:
    a smart textile pocket, wherein the smart textile pocket comprises a first pocket side and a second pocket side;
    a first near field communication (NFC) transmitter embedded in the first pocket side;
    an NFC receiver embedded in the second pocket side;
    an electromyography (EMG) sensor embedded in a sleeve of the smart textile garment, wherein the EMG sensor indicates a physical movement of a hand of a wearer of the smart textile garment in real time;
    an event processor coupled to the first NFC transmitter and the NFC receiver to detect a change in an NFC signal strength between the first NFC transmitter and the NFC receiver, wherein the change in the NFC signal strength between the first NFC transmitter and the NFC receiver indicates that an object has been removed from the smart textile pocket, wherein the event processor correlates EMG sensor readings from the EMG sensor and the NFC signal strength between the first NFC transmitter and the NFC receiver to determine that the object has been removed from the smart textile pocket without use of the hand of the wearer of the smart textile garment, and wherein the event processor generates and transmits an event signal in response to determining that the object has been removed from the smart textile pocket without use of the hand of the wearer of the smart textile garment; and
    an alert device, wherein the alert device emits an alarm in response to receiving the event signal from the event processor.

2. The smart textile garment of claim 1, of claim 1, further comprising:
    a second NFC transmitter embedded in a cuff of a sleeve on the smart textile garment, wherein the event processor determines that the hand of the wearer of the smart textile garment is being placed proximate to the smart textile pocket in response to the NFC receiver receiving an NFC signal from the second NFC transmitter that exceeds a predetermined strength.

3. The smart textile garment of claim 1, wherein the object is a ferrous object.

4. The smart textile garment of claim 1, wherein the object is a non-ferrous object.

5. The smart textile garment of claim 1, wherein the alert device emits a haptic signal.

6. The smart textile garment of claim 1, wherein the alert device emits an aural signal.

7. The smart textile garment of claim 1, wherein the event processor transmits the event signal to a monitoring computer that is remote to the smart textile garment.

8. A method for detecting an improper removal of an object from a smart textile pocket in a smart textile garment, the method comprising:
    detecting, by an event processor coupled to a first near field communication (NFC) transmitter embedded in a first pocket side of a smart textile pocket and an NFC receiver embedded in a second pocket side of the smart textile pocket, a change in an NFC signal strength between the first NFC transmitter and the NFC receiver, wherein the change in the NFC signal strength between the first NFC transmitter and the NFC receiver indicates that an object has been removed from the smart textile pocket;
    receiving, from an electromyography (EMG) sensor embedded in a sleeve of the smart textile garment, an EMG positioning signal that indicates a physical movement of a hand of a wearer of the smart textile garment in real time;
    correlating, by the event processor, EMG sensor readings from the EMG sensor and the NFC signal strength between the first NFC transmitter and the NFC receiver to determine that the object has been removed from the smart textile pocket without use of the hand of the wearer of the smart textile garment, wherein the event processor generates and transmits an event signal in response to determining that the object has been removed from the smart textile pocket without use of the hand of the wearer of the smart textile garment; and emitting, by an alert device, an alarm in response to the alert device receiving the event signal from the event processor.

9. The method of claim 8, further comprising:

detecting, by the NFC receiver, an NFC signal from a second NFC transmitter embedded in a cuff of a sleeve on the smart textile garment, wherein the event processor determines that the hand of the wearer of the smart textile garment is being placed proximate to the smart textile pocket in response to the NFC receiver receiving the NFC signal from the second NFC transmitter that exceeds a predetermined strength.

10. The method of claim 8, further comprising:

detecting, by the NFC receiver, an NFC signal from a second NFC transmitter embedded in a cuff of a sleeve on the smart textile garment, wherein the event processor determines that the hand of the wearer of the smart textile garment is being placed within the smart textile pocket in response to the NFC receiver receiving the NFC signal from the second NFC transmitter that exceeds a predetermined strength.

11. The method of claim 8, wherein the object is a non-ferrous object.

12. The method of claim 8, wherein the alert device emits a haptic signal.

13. The method of claim 8, wherein the alert device emits an aural signal.

14. The method of claim 8, further comprising:

transmitting, from the event processor to a monitoring computer, the event signal, wherein the monitoring computer is remote to the smart textile garment.

15. A computer program product for detecting an improper removal of an object from a smart textile pocket in a smart textile garment, the computer program product comprising a non-transitory computer readable storage medium having program code embodied therewith, the program code readable and executable by a processor to perform a method comprising:

detecting, by an event processor coupled to a first near field communication (NFC) transmitter embedded in a first pocket side of a smart textile pocket and an NFC receiver embedded in a second pocket side of the smart textile pocket, a change in an NFC signal strength between the first NFC transmitter and the NFC receiver, wherein the change in the NFC signal strength between the first NFC transmitter and the NFC receiver indicates that an object has been removed from the smart textile pocket;

receiving, from an electromyography (EMG) sensor embedded in a sleeve of the smart textile garment, an EMG positioning signal that indicates a physical position of a hand of a wearer of the smart textile garment in real time;

correlating EMG sensor readings from the EMG sensor and the NFC signal strength between the first NFC transmitter and the NFC receiver to determine that the object has been removed from the smart textile pocket without use of the hand of the wearer of the smart textile garment, wherein the event processor generates and transmits an event signal in response to determining that the object has been removed from the smart textile pocket without use of the hand of the wearer of the smart textile garment; and emitting, via an alert device, an alarm in response to the alert device receiving the event signal from the event processor.

16. The computer program product of claim 15, wherein the method further comprises:

receiving, by the NFC receiver, an NFC signal from a second NFC transmitter embedded in a cuff of a sleeve on the smart textile garment, wherein the event processor determines that the hand of the wearer of the smart textile garment is being placed proximate to the smart textile pocket in response to the NFC receiver receiving the NFC signal from the second NFC transmitter that exceeds a predetermined strength.

17. The computer program product of claim 15, wherein the object is a non-ferrous object.

18. The computer program product of claim 15, wherein the alert device emits a haptic signal.

19. The computer program product of claim 15, wherein the alert device emits an aural signal.

20. The computer program product of claim 15, wherein the method further comprises:

transmitting, from the event processor to a monitoring computer, the event signal, wherein the monitoring computer is remote to the smart textile garment.

\* \* \* \* \*